(No Model.) 2 Sheets—Sheet 1.
J. PLEUKHARP.
CROZING AND CHAMFERING MACHINE.
No. 454,765. Patented June 23, 1891.
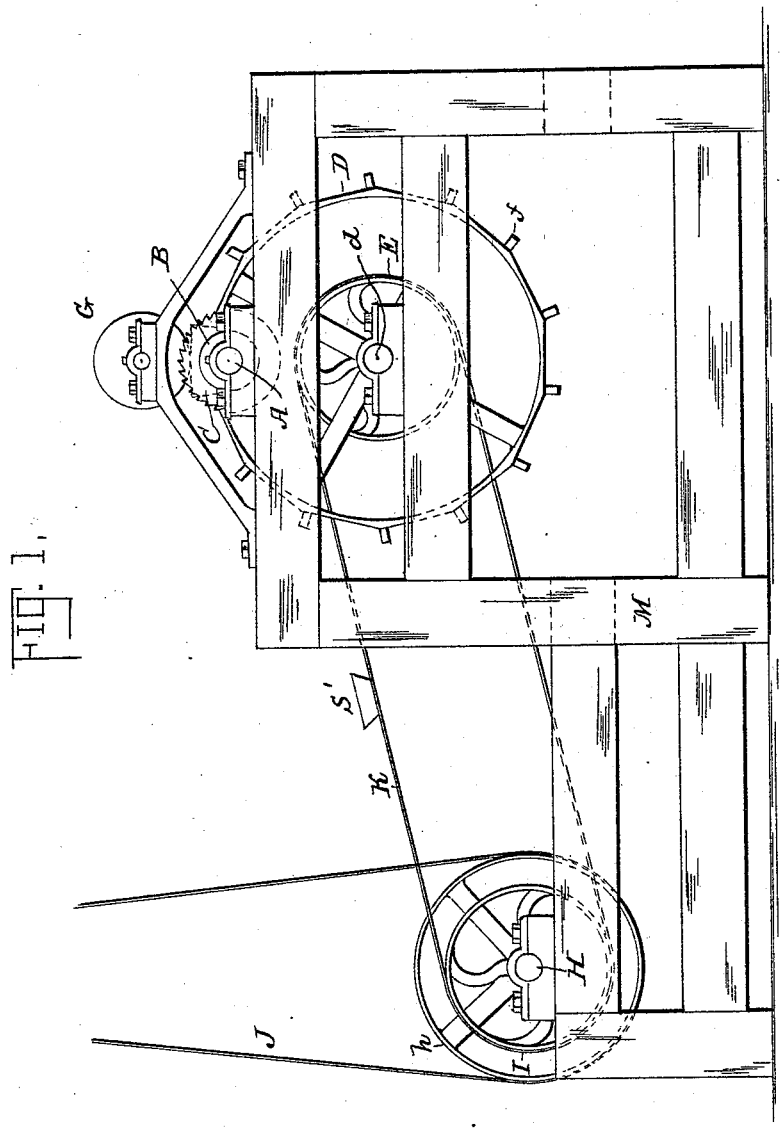
WITNESSES:
Saml R. Turner
Van Buren Hillyard.
INVENTOR
James Pleukharp.
BY
R.H.H. Lacey
HIS-ATTORNEY.'S (No Model.) 2 Sheets—Sheet 2.
J. PLEUKHARP.
CROZING AND CHAMFERING MACHINE.
No. 454,765. Patented June 23, 1891.
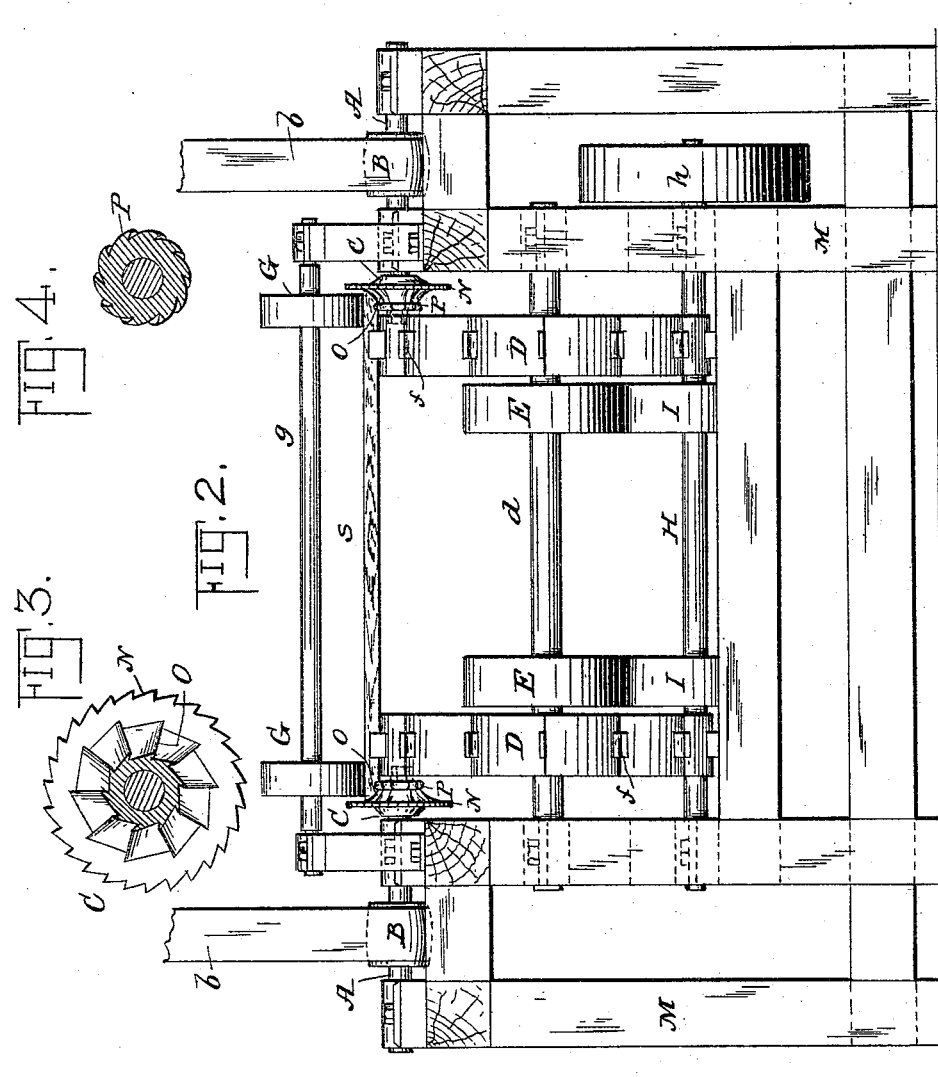
WITNESSES:
Saml R. Turner
Van Buren Hillyard
INVENTOR
James Pleukharp
BY
R.S. & A.H. Lacey
HIS-ATTORNEY.S

UNITED STATES PATENT OFFICE.

JAMES PLEUKHARP, OF COLUMBUS, OHIO.

CROZING AND CHAMFERING MACHINE.

SPECIFICATION forming part of Letters Patent No. 454,765, dated June 23, 1891.

Application filed September 18, 1890. Serial No. 365,421. (No model.)

*To all whom it may concern:*

Be it known that I, JAMES PLEUKHARP, a citizen of the United States, residing at Columbus, in the county of Franklin and State of Ohio, have invented certain new and useful Improvements in Crozing and Chamfering Machines; and I do hereby declare the following to be a full, clear, and exact description of the invention, such as will enable others skilled in the art to which it appertains to make and use the same.

This invention relates to crozing and chamfering machines.

The purpose of the invention is to provide a machine which will cut the staves to a uniform length and chamfer and croze them at one and the same operation, and which will automatically and positively feed the staves to the cutting, chamfering, and crozing devices and automatically carry off the completed staves.

The improvement consists of the peculiar construction and novel combination of the parts, which will be hereinafter more fully described and claimed, and which are shown in the annexed drawings, in which—

Figure 1 is a side view, and Fig. 2 a rear view, of a machine embodying my invention. Fig. 3 is a central section through the chamfering-tool parallel with and looking toward the saw. Fig. 4 is a central section through the crozing-tool parallel with and looking away from the saw.

The frame M is of suitable construction and adaptation to receive and support the operating parts of the machine, and no novelty is claimed therefor.

The feeding-drum D D is mounted on shaft $d$, which is journaled at its ends on the frame, and is provided at intervals around its periphery with projections $f$, which engage with and carry the stock forward to the cutter-heads. The drum is composed, preferably, of two disks, which are located the proper distance apart on the shaft $d$, and is a polygon, the stock being placed on the flat sides.

The cutting devices, one being provided to operate on each end of the stock, comprise mandrel A, which is journaled on the frame M, cutter-head C at the inner end of the mandrel, and band-pulley B, around which band $b$ passes to transmit motion from a suitable motive power to the said mandrel. The cutter-head C is composed of three separate cutters, each being designed for a specific purpose, the saw N, which cuts the stock the required length, chamfer-cutter O, which bevels the end of the stock, and the crozing-tool P, which makes the groove in the stock at the base of the chamfer. These three cutters may be integral or formed separately and secured on the mandrel, so as to revolve therewith. The feeding-drum D D is arranged wholly between the planes of the cutter-heads C C, and the ends of the stock project beyond the ends of the drum to be operated on by the said cutter-heads.

The resistance-roller G G is arranged directly above the feeding-drum, and is designed to hold the stock on the drum against the action of the cutter-heads, and is elastic, being made of rubber, to yield to a slight variation in the thickness of the stock. This roller is composed of shaft $g$ and rubber disks G G, mounted on the shaft near each end thereof.

The counter-shaft H, journaled on the frame, is provided on its outer end with band-wheel $h$, which is driven by belt J, and with pulleys I I near each end thereof. Belts K K pass around pulleys I I and corresponding pulleys E E on shaft $d$ and serve to transmit motion from shaft H to drum D D and to carry off the completed stave.

In practice the machine is set in operation in the manner hereinbefore set forth, and the stock is fed by hand or otherwise to the drum D D, which carries it forward to the cutters C C, which cut off any projecting end and chamfer and croze the stock. The completed stave drops onto the belts K K, which carry it to the end of the machine. (See S′ in Fig. 1.)

Having thus described my invention, what I claim, and desire to secure by Letters Patent, is—

In a machine for crozing and chamfering staves, the combination of the shaft $d$, the polygonal disks D D, mounted on the shaft and having projections $f$ at regular intervals about their peripheries, the pulleys E, secured on the shaft $d$ near the inner sides of the disks D, the independently-operated mandrels A, provided with the cutting, crozing, and chamfering tools, which are exterior to the outer ends of the disks D, the shaft $g$, having the yielding resistance-disks G directly above the cutting-tools and the disks D, the counter-shaft H, having pulleys I I, and the belts K K, passing over the pulleys I and E and adapted to transmit motion from the said shaft H to the shaft $d$ and serve as a conveyer to carry the completed staves from the disks D, substantially as set forth.

In testimony whereof I affix my signature in presence of two witnesses.

JAMES PLEUKHARP.

Witnesses:
BARTON GRIFFITH,
HARRY PRICE.